United States Patent Office 3,541,065
Patented Nov. 17, 1970

3,541,065
POLYMERIZING CYCLIC OXIDE COMPOUNDS WITH SULFUR-TYPE METAL-ALKYL CO-CATALYTIC COMPOSITIONS
Otto C. Elmer, Akron, and Arden E. Schmucker, Hartville, Ohio, assignors to The General Tire & Rubber Company, Akron, Ohio, a corporation of Ohio
No Drawing. Filed Nov. 12, 1964, Ser. No. 410,714
Int. Cl. C08f 5/00, 7/12
U.S. Cl. 260—88.3                                    31 Claims

ABSTRACT OF THE DISCLOSURE

Organic cyclic oxides such as ethylene oxide, propylene oxide, allyl glycidyl ether and the like are polymerized under essentially nonoxidizing conditions using as a catalyst a composition comprising (1) sulfur, selenium or tellurium or mixture thereof and (2) an aluminum, cadmium or zinc alkyl, alkaryl and/or aralkyl compound or mixture thereof. The resulting polymers or copolymers may be liquids or solids. The liquids are useful as plasticizers for other resins and plastics. The solids can have viscosities of from 0.5 to 7.0 and can be used for making tires, shoe heels, rain coats and so forth.

---

This invention relates to improved catalysts for polymerizing cyclic monoxide-containing organic compounds, and more particularly to catalysts of tellurium, selenium and/or sulfur, used together with metal alkyls, alkaryls and/or aralkyls to polymerize oxygen-containing heterocyclic compounds such as olefin oxides and/or unsaturated organic cyclic oxide compounds. The invention also relates to polymerizing $C_2$ to $C_6$ alkylene monoxides such as $C_2$ to $C_4$ epoxides, alone or with minor amounts of $C_4$ to $C_{10}$, preferably $C_4$ to $C_7$, unsaturated hydrocarbons containing at least one cyclic monoxide group, using a co-catalytic composition of tellurium, selenium or especially sulfur, together with certain Group II–b and/or Group III–a metal alkyls.

It is an object of the present invention to provide improved catalytic compositions for polymerizing $C_2$ to $C_6$ alkylene oxides alone or with certain unsaturated cyclic monoxides.

Another object of the present invention is to provide improved methods for polymerizing saturated or unsaturated epoxides with a catalytic combination comprising tellurium, selenium and/or sulfur, together with cadmium, aluminum and/or zinc alkyls, alkaryls and/or aralkyls.

Other objects and advantages of the invention will become apparent from the following description, including the examples and the appended claims.

In accordance with the instant invention, heterocyclic monoxide compounds comprising from at least 60 and preferably at least 80 to 100 mol percent of $C_2$ to $C_6$ saturated epoxides together with 0 or 0.01 to 20 or 40 mol percent, preferably 1.0 to 15.0 or 30.0 mol percent of $C_4$ to $C_{10}$, preferably $C_4$ to $C_7$ or $C_8$ unsaturated epoxide compounds are reacted to form homopolymers and copolymers which have excellent tear strength, providing the polymerization or copolymerization is carried out in a substantially inert atmosphere using a catalyst comprising tellurium, selenium and/or especially sulfur, together with metal alkyls. Mixtures of tellurium, selenium and sulfur, together with one or more metallo-organic materials such as metal alkyls and/or metal alkaryls, and/or metal aralkyls are further within the purview of the present invention.

The most desirable catalytic combination of the present invention comprises a sulfur-type element and a member selected from the group consisting of cadmium alkyls, aluminum alkyls and/or especially zinc alkyls. It is even more desirable to utilize a catalytic combination of about 0.25 to 6.0 mols, preferably about 1.0 to 4.0 mols of sulfur per mol of a metal alkyl which is preferably either a $C_2$ to $C_8$, and even more especially a $C_2$ to $C_6$ alkyl of zinc and/or aluminum.

As typical of the metal alkyls to be used in conjunction with tellurium, selenium and/or especially sulfur to form the composite-catalyst of the invention useful for the polymerization and copolymerization of saturated and unsaturated epoxides, as will be more fully described hereinafter, are tributyl aluminum, trioctyl aluminum, dibutyl cadmium, diethyl cadmium, diisopropyl cadmium, dimethyl zinc, diethyl zinc, methylethyl zinc, diisobutyl zinc, methylisopropyl zinc, di-n-propyl zinc, didodecyl zinc, isobutyl ethyl zinc, diisopropyl zinc, trimethyl aluminum, triethyl aluminum, trihexyl aluminum, methyldiethyl aluminum, triisobutyl aluminum, diisobutyl cadmium, dihexyl cadmium, dimethyl cadmium, diheptyl cadmium, ethylpropyl cadmium, dibutyl zinc, diisopentyl zinc, methylphenyl zinc, butyl methyl zinc, dipentyl zinc, methyl isopentyl zinc, mixtures thereof, and the like.

In one method of practicing the present invention, the catalytic sulfur-type element, preferably together with a small amount of an antioxidant such as, for example, phenyl beta naphthylamine, are charged to a reactor. The reactor is then flushed with an inert gas such as nitrogen and the reactor capped. Then, through selectively opened conduits leading to the reactor the monomers are added, preferably together with a small amount of a light inhibitor such as, for example, nitrobenzene. Finally, the co-catalyst (i.e., the metal alkyl) such as zinc diethyl is added. Alternatively, the sulfur-type element may be added to the epoxide or epoxides after the addition of a solution of the metal alkyl or alkyls have been dissolved in a suitable solvent such as benzene, xylol, or the like. In either instance, it is often desirable to dissolve the metal alkyl.

The cyclic oxides, which are preferably selected from the group consisting of saturated and unsaturated epoxides, and which are polymerized by the utilization of the improved catalytic-combination of the present invention, include cyclic oxide compounds having from 1 to 3 oxygen-carbon rings in which the oxygen atom thereof is joined with 3, preferably 2 carbon atoms. It is at the juncture in the cyclic oxide structure that the cyclic ring polymerizes with the same of other cyclic oxide comonomers through epoxide groups therein, when catalytically promoted such as by the sulfur-metal alkyl catalyst combinations of the present invention.

In the case of producing rubbery copolymers, a minor proportion, advantageously less than 40 or 30 mol percent and preferably 0.5 or 1.0 to 25.0 mol percent of the unsaturated cyclic oxide monomers may contain 2, preferably 1 aliphatic radical having about 3 to 10 carbon atoms and containing not more than 2 and preferably 1 carbon-to-carbon double bond.

The preferred epoxides polymerized by the improved process utilizing the novel catalytic combination of the present invention include 80 or 85 to 99 mol percent of, say, ethylene oxide, propylene oxide and/or butylene oxide, together with 1.0 to 15.0 or 20.0 or 30.0 mol percent of one or more of the following unsaturated epoxy compounds or their equivalents such as, for example, allyl glycidyl ether, butadiene monoxide, glycidyl acrylate, vinyl cyclohexene monoxide, 2-methyl-5,6-epoxyhexene-1, mixtures thereof, etc.

It is to be understood further that certain halogen, ether, nitro and ester substituted derivatives of the cyclic oxides, i.e., the epoxide compounds listed above are operative for the purposes of the invention, and that other useful cyclic oxides include, among others, vinyl cyclohexene dioxide, isobutylene monoxide, methyl glycidyl ether, pentylene monoxide, nitro ethylene oxide, 1,2-epoxy-2-methyl hexane, butadiene dioxide, epibromohydrin, glycidyl acrylate, isoprene dioxide, glycidyl methyl acrylate, epichlorohydrin, isoprene monoxide, diisobutylene monoxides, dicyclopentadiene monoxide, allyl epoxy stearate, dicyclopentadiene dioxide, digylcidyl ethers of alkane diols as well as polyalkylene and/or polyarylene ether glycols, alone, or in admixture.

When the cyclic oxide monomer or comonomer contains at least 2 epoxide or similar cyclic monoxide groups, the catalyst combination of the present invention is useful in polymerizing such materials into polymeric compositions useful in electrical insulation. Certain other products, obtained by practicing the invention, have utility in molding compositions, as lubricant thickening agents and in coating applications.

The catalyst is used in only a minor amount and just sufficient to catalyze the reaction inasmuch as large amounts may overpolymerize or decompose the resulting polymer or copolymer to a molecular weight other than that which is desired.

Although about 0.01 to 10.0 mols of catalyst combination per 100 mols of total monomer(s) may be used, it is advantageous to employ about 0.05 to 7.0 mols, preferably from 0.1 to 4.0 mols of catalyst on this same basis.

The monomer(s) may be polymerized in mass or in solvent as is well-known in the art and they should be polymerized under substantially complete nonoxidizing conditions, for example, under nitrogen, helium, or under other inert media. It is also possible to conduct the polymerization in the presence of vaporized solvent, diluent, monomer, comonomer and/or partially dimerized monomer as the inert medium.

Polymerization normally is conducted at temperatures from 25° to 250° C., preferably from 40° to 150° C. Inasmuch as the polymerization reaction is exothermic, it is desirable in some instances to use added aromatic, aliphatic or ether solvents. However, it is often preferred to omit such solvents and to limit the monomer and catalyst concentrations to within about 35% and preferably to within about 20% of the overall ranges given in the examples. Conventional methods are used to remove the catalyst from the polymerization mixture.

Homopolymers and copolymers, produced using the catalytic combination of the invention, may be compounded with curing agents, resins, fillers, antioxidants, pigments, plasticizers, rubbers, zinc oxide, stearic acid, conventional accelerators such as mercaptobenzothiazole or benzothiazyl disulfide, ultraaccelerators such as tetramethyl thiuram disulfide, etc. Typical fillers include, among others, carbon black, titanium dioxide, silica, silica-alumina, phthalocyanine green, dialkyl phthalates, tricresyl phosphate, Kieselguhr, montmorillonites, and the like. Pine oil, asphalt, cracked wax-distillates, tars, and pitches also may be added.

Typical rubbers, useful with polymers produced using the catalytic combination of the invention, include, among others, natural rubber, cis-1,4-polybutadiene rubber, SBR rubber, Buna-N-rubber, polyisoprene, halogenated butyl rubber, mixtures thereof, etc. Also, isobutylene-styrene resins, acrylonitrile-styrene resins, polyester and/or ether urethanes, polyvinyl chloride or PVC-polyvinyl acetates may be compounded with polymers produced using the catalytic combination of the invention.

When the polymers produced by the process of the present invention have high intrinsic viscosities of about 0.5 or 1.0 to about 5.0 or 7.0, they are especially useful in making tires, gaskets, coatings for fabrics, elastic fibers, shoe heels, raincoats, floor mats, adhesives, molded articles and the like. Liquid polymers of lower intrinsic viscosities, produced using the novel catalytic combination of the invention, are useful as plasticizers for synthetic resins and plastics.

The invention will be best understood from the following examples which are given for purposes of illustration only and are not to be construed as limiting the present invention:

GENERAL PROCEDURE USED IN EXAMPLES

To a clean, dry, quart polymerization glass bottle, the antioxidant phenyl beta naphthylamine and the sulfur co-catalyst are added. The bottle is capped with a 3-hole, rubber-lined cap and flushed well with nitrogen. The monomer or comonomer cyclic monoxides, such as the epoxides given hereinafter, then are added, followed by a zinc diethyl co-catalyst and preferably also a light inhibitor. The bottles then are placed in a thermostated tumbling polymerization bath and polymerization is conducted for 50 hours at 25° C. To remove polymer from the bottle, the bottle is cracked, the polymer being cut into small pieces and dried in vacuo (25 mm. Hg absolute) at 50° C. (unless otherwise indicated). The following examples will show the advantages of the present invention:

Example I

The following are charged by the aforementioned general procedure to polymerization glass bottles, together with the amounts of sulfur co-catalyst listed hereinafter:

Propylene oxide—20.0 g.
Antioxidant (phenyl beta naphthylamine)—0.1 g.
Nitrobenzene light inhibitor—0.02 cc.
Allyl glycidyl ether—1.2 g.
Catalyst (zinc diethyl) (1 mol percent)—0.37 cc.

| Run No. | Sulfur (g.) | Sulfur to zinc diethyl mol ratio | Percent conversion | Intrinsic viscosity of 0.2 solution in acetone at 25° C. |
|---|---|---|---|---|
| A | 0.12 | 1.0:1 | 5.0 | 1.29 |
| B | 0.18 | 1.5:1 | 14.0 | 3.44 |
| C | 0.25 | 2.0:1 | 15.0 | 3.88 |
| D | 0.49 | 4.0:1 | 75.0 | 6.36 |

When 100 parts by weight of the polymer materials obtained utilizing the procedure outlined in Runs A through D of Example I of the invention are compounded with 40 parts of the SAF carbon black, Philblack E, 1 part of benzothiazyl disulfide, 1 part of tetramethylthiuram disulfide, 2 parts of sulfur, 2 parts stearic acid, 5 parts of zinc oxide and 0.5 part of additional phenyl beta naphthylamine (antioxidant) and cured at 287° F. for 50 minutes; finished products are obtained having moduli at 300% elongation of above 500 p.s.i., tensile strengths above 2,000 p.s.i., elongations in excess of 500%, tensile sets (i.e., permanent sets) of between 35 and 60 percent and a tear strength in excess of that for regular Mooney SBR rubber produced and cured under the same conditions. Also, abrasion tests of the cured products of Runs B to D showed between 3% and 8% better wear on an angle abrader than a regular Mooney SBR control.

Example II

The following are charged by the aforementioned general procedure to a polymerization glass bottle:

Propylene oxide—200.0 g.
Antioxidant (phenyl beta naphthylamine)—1.06 g.
Nitrobenzene light inhibitor (may be omitted if polymerization conducted in substantial darkness)—0.18 cc.
Allyl glycidyl ether—12.0 cc.
Zinc diethyl catalyst (1 mol percent)—3.7 cc.
Sulfur co-catalyst (sulfur:zinc alkyl mol ratio=3:1)—3.7 g.

Polymerization is for 61 hours at 25° C., the conversion of monomer to polymer being 96.0 weight percent.

The inherent viscosity of a 0.3 weight percent solution of polymer in acetone is found to be 7.36.

This copolymer is compounded on a mill according to the following formulation:

| | Parts by weight |
|---|---|
| Copolymer | 100 |
| Sulfur | 2.0 |
| Benzothiazyl disulfide | 1.0 |
| Tetramethylthiuram disulfide | 1.0 |
| Zinc oxide | 5.0 |
| SAF carbon black (Philblack E) | 40.0 |

After curing of the above compounded rubbery copolymer stock for 50 minutes at 287° F., the following properties are noted compared to an additional test specimen of the same copolymer cured under the identical conditions in the absence of added carbon black:

| | A (with carbon black) | B (no carbon black) |
|---|---|---|
| Modulus at 300 percent elongation, p.s.i. | 875 | 250 |
| Tensile strength, p.s.i. | 2,125 | 2,725 |
| Elongation, max. percent | 600 | 750 |
| Shore-A hardness | 74 | 50 |

The above data shows that a high tensile strength product is formed using conventional curatives and without needed carbon black. Elongation values both with and without carbon black are acceptable. The data also shows that the Shore-A hardness improves approximately 1½ times by the addition of SAF carbon black.

When Example II is repeated except that such sulfur-releasing curatives as mercaptobenzothiazole and/or tetramethylthiuram disulfide are substituted for the sulfur, the result is that no polymer is formed. This shows that sulfur releasing agents in general are not equivalent to elemental sulfur-type materials for use in the catalytic combination of the present invention. Also, when the method of Example II is repeated substituting zinc oxide and zinc sulfide, respectively, in place of the zinc diethyl, no polymer is obtained. This shows that it is necessary to employ not only the above sulfur-type elements, but also added metal alkyl compounds such as zinc diethyl in accordance with the invention. When the method of Example II is repeated using zinc diethyl without added sulfur as co-catalyst, no appreciable change in inherent viscosity compared to a solution of monomer is noted. This demonstrates that neither the sulfur-type elements tellurium, selenium or sulfur or the metal alkyls are effective epoxide polymerization catalysts used by themselves, but that a combination of such sulfur-type elements and metal alkyls are required for the epoxide polymerization process in accordance with the present invention.

Example III

The same general procedure as in Example II is repeated except the amount of sulfur is doubled to give a mol ratio of sulfur to zinc of 6:1. Conversion after 61 hours at 25° C. is found to be 98% of a polymer having an inherent viscosity (0.3% in acetone) of 3.0. The same compounding and curing procedure is followed as in Example II, with the following results being obtained:

| | A (with carbon black) | B (no carbon black) |
|---|---|---|
| Modulus at 300 percent elongation, p.s.i. | 875 | 175 |
| Tensile strength, p.s.i. | 2,450 | 1,050 |
| Elongation, percent | 680 | 630 |
| Shore-A hardness | 62 | 35 |

The above data show that a low tensile strength product is produced without added SAF carbon black, but that the tensile strength is more than doubled with the addition of 40 parts carbon black per 100 parts rubber.

Example IV

The same general procedure as in Example I is used again, with the following materials being charged to a glass polymerization reactor:

Propylene oxide (comonomer)—150.0 g.
Allyl glycidyl ether (comonomer)—9.0 cc.
Antioxidant (phenyl beta naphthylamine)—0.8 g.
Nitrobenzene light inhibitor—0.13 cc.
Zinc diethyl catalyst (0.3 mol percent)—0.84 cc.
Sulfur co-catalyst (mol ratio sulfur:zinc of 3:1)—0.78 g.

Polymerization is conducted at 25° C. for 25 hours with 97 weight percent conversion of monomer to rubbery copolymer. The inherent viscosity of a 0.3 weight percent solution of copolymer in acetone is found to be 1.97; the Mooney viscosity (ML-4, 212° F. is 18). After compounding as in Example II but curing for 55 minutes at 287° F., the following results are obtained:

| | A (with carbon black) | B (no carbon black) |
|---|---|---|
| Modulus at 300 percent elongation, p.s.i. | 850 | 175 |
| Tensile strength, p.s.i. | 3,125 | 1,425 |
| Elongation, percent | 770 | 680 |
| Shore-A hardness | 62 | 36 |

The carbon black-containing rubbery copolymer stock is aged at 300° F. for 24 hours with the following results:

| | P.s.i. |
|---|---|
| Modulus at 300% elongation | 1500 |
| Tensile strength | 1975 |

The above data shows that certain of the rubbery copolymers, produced by the catalytic combination of the invention, have only moderate age resistance at elevated temperatures. However, on an angle abrader, this cured rubbery copolymer (before aging) when compounded with 40 parts of SAF carbon black has a better index of 107 compared to 100 for regular SBR rubber control.

Example V

The same general procedure as in Example II is repeated substituting an equivalent number of mols of selenium for sulfur, the amount of zinc diethyl co-catalyst being the same as before, polymerization also being carried out at 25° C., but for 74 hours rather than for 61 hours. A conversion of monomer to polymer of 80 weight percent is noted, the inherent viscosity at 25° C. of the resulting rubbery copolymer (0.2% in isopropyl alcohol) being 1.75.

Example VI

The same general procedure as in Example III is repeated substituting an equivalent number of mols of tellurium for sulfur, the amount of zinc diethyl co-catalyst being the same and the conditions being otherwise identical to those in Example III. A conversion of 97 percent by weight is noted after 3 hours, the inherent viscosity of the resulting polymer (0.2% in isopropanol) being 0.18.

Example VII

The same general procedure as in Example III is repeated with the identical amounts of sulfur and zinc diethyl being used. However, in this example, no added allyl glycidyl ether is used, the total amount of cyclic monoxide monomer being propylene oxide. Also, the polymerization temperature is increased to 80° C. and is continued for 80 hours. The resulting polymer formed is found to be a homopolymer having an inherent viscosity (0.2 weight percent in isopropanol) of 0.77. This polymer is found to be useful in viscosity index improvers for high pressure synthetic lubricants, in heat-resistant coatings for metals, and as a plasticizer for 2,6-dimethylol-phenol-formaldehyde resin.

Example VIII

A homopolymer of propylene oxide was prepared in the following manner:

A glass reactor was flushed with nitrogen and charged with:

Benzene—100 cc.
Aluminum triethyl—2.34 cc.
Sulfur—0.275 g.

This reactor was agitated at room temperature for 2 hours. At the end of this period, 100 g. of propylene oxide containing 0.155 cc. of water were added. The mixture was agitated for 26 hours at room temperature and for 48 hours at 80° C. After this reaction period the volatile components were removed under vacuum and the resultant 28.5 g. of polymer had a rubbery consistency and an intrinsic viscosity in benzene of 2.01.

Further data show that in the case of co-catalytic compositions containing zinc alkyls, alkaryls and aralkyls, the presence of water is undesirable. However, in the case of Group III–a metal alkyls, alkaryls and aralkyls, and especially for aluminum alkyls, the presence of about 25 to 75 weight percent of added water based on amount of sulfur-type metallo-organic compound is beneficial, as is shown in the foregoing example.

Resort may be had to modifications and variations without departing from the spirit of the invention or the scope of the appended claims.

What is claimed is:

1. A catalytic composition useful for polymerizing organic cyclic oxide compounds which comprises essentially (1) an element selected from the group consisting of tellurium, selenium, sulfur, and mixtures thereof, and (2) a metallo-organic compound selected from the group consisting of cadmium, aluminum and zinc alkyls, alkaryls, aralkyls, and mixtures thereof, the mol ratio of said element to said compound being from about 0.25:1 to 6.0:1.

2. A composition in accordance with claim 1 in which there is a ratio of from about 1.0 to 4.0 mols of said element to about one mol of said metallo-organic compound.

3. A composition in accordance with claim 1 in which said element is sulfur and said compound is a zinc alkyl.

4. A composition in accordance with claim 1 in which said compound is an aluminum alkyl and wherein said composition contains additionally from about 25 to 75 weight percent based on said element of water.

5. A composition in accordance with claim 1 in which said compound is a cadmium alkaryl.

6. The method which comprises, under nonoxidizing conditions, mixing at least one polymerizable organic cyclic oxide having a ring of from 2 to 3 carbon atoms and one oxygen atom with a catalytic composition to polymerize said oxide and polymerizing said oxide in admixture with said composition to form a polyether, said composition comprising essentially an element selected from the group consisting of tellurium, selenium, sulfur, and mixtures thereof, and metallo-organic compound selected from the group consisting of cadmium, aluminum and zinc alkyls, alkaryls, aralkyls, and mixtures thereof at a temperature of from about 25° to 250° C., the mol ratio of said element to said compound being from about 0.25:1 to 6.0:1 and the mol ratio of said composition to said oxide being from about 0.01:100 to 10:100.

7. The method according to claim 6 in which the reaction temperature is from about 40° to 150° C.

8. The method according to claim 6 in which during the polymerization reaction there is additionally present an inert organic solvent.

9. The method according to claim 6 in which said oxide comprises from about 70 to 99.0 mol percent of a $C_2$ to $C_6$ alkylene oxide and from about 30 to 1 mol percent of allyl glycidyl ether.

10. The method according to claim 6 in which said oxide comprises from about 80 to 99.0 mol percent of a $C_2$ to $C_4$ alkylene cyclic oxide and from about 20 to 1 mol percent of a $C_4$ to $C_{10}$ cyclic oxide containing a carbon-to-carbon double bond.

11. The method according to claim 10 in which the major monomer component is propylene oxide.

12. The method according to claim 10 in which the minor monomer component is selected from the group consisting of butadiene monoxide, allyl glycidyl ether, gylcidyl acrylate, vinyl cyclohexene monoxide, 2-methyl-5,6-epoxyhexene-1, and mixtures thereof.

13. A catalytic composition comprising essentially an element selected from the group consisting of tellurium, selenium, sulfur, and mixtures thereof, and a $C_2$ to $C_8$ zinc alkyl, the mol ratio of said element to said alkyl being from about 0.25:1 to 6.0:1.

14. A catalytic composition comprising essentially an element selected from the group consisting of tellurium, selenium, sulfur, and mixtures thereof, and a $C_2$ to $C_8$ aluminum alkyl, the mol ratio of said element to said alkyl being from about 0.25:1 to 6.0:1.

15. A catalytic composition comprising essentially an element selected from the group consisting of tellurium, selenium, sulfur, and mixtures thereof, and a $C_2$ to $C_8$ cadmium alkyl, the mol ratio of said element to said alkyl being from about 0.25:1 to 6.0:1.

16. A catalytic composition comprising essentially from about 1 to 4 mols of sulfur and about 1 mol of a metallo-organic compound selected from the group consisting of cadmium, aluminum, and zinc alkyls, alkaryls, aralkyls, and mixtures thereof.

17. A catalytic composition in accordance with claim 16 in which the metallo-organic compound is zinc diethyl.

18. The method according to claim 6 in which said metallo-organic compound is an aluminum metallo-organic and in which said composition contains additionally water in an amount of from about 25 to 75% by weight of said element.

19. The polymerization process which comprises:
(I) selecting a monomeric material which comprises at least one epoxide with the formula:

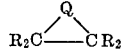

(a) wherein Q is oxygen, and
(b) wherein R is a member of the group consisting of hydrogen, hydrocarbon radicals, and oxyhydrocarbon radicals containing up to 10 carbon atoms,
(II) mixing said monomeric materials with a catalytic amount of a catalyst comprising a mixture of:
(a) at least one member selected from the group consisting of sulfur, selenium, and tellurium,
(b) at least one substituent with the formula $MR'_n$,
(1) wherein R' is, individually, a hydrocarbon radical containing up to 10 carbon atoms,
(2) M is a metal selected from the group consisting of zinc, cadmium, aluminum and mixtures thereof,
(3) $n$ is the valence of the metal M, and
(III) reacting said mixture under suitable polymerization conditions until a polymer is formed.

20. The process according to claim 19 wherein the monomeric material comprises at least one member of the alkylene oxides represented by the formula:

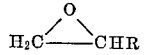

21. The process according to claim 19 wherein the monomeric materials comprise between 80 and 99 mol percent of at least one member selected from the group consisting of propylene oxide, 1-butene oxide, and mixtures thereof; and 20 to 1 percent comprising at least one member selected from the group consisting of allyl glycidyl ether, vinyl cyclohexene monoxide, epichlorohydrin, dicyclopentadiene monoxide, isoprene monoxide, butadiene monoxide, and mixtures thereof.

22. The process according to claim 19 wherein $MR_n'$ represents dialkyl zinc.

23. The process according to claim 19 wherein the catalyst is a mixture consisting of $MR_n'$ and sulfur, and wherein the atomic ratio of sulfur to metal is greater than 0.2.

24. The process according to claim 19 wherein the monomeric material is represented by the formula:

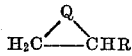

and the catalyst is a mixture of dialkyl zinc and sulfur and wherein the atomic ratio of sulfur to zinc is greater than 1.

25. The process according to claim 19 wherein the monomeric material is represented by the formula:

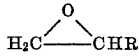

and the catalyst is a mixture of trialkyl aluminum and sulfur and wherein the atomic ratio of sulfur to aluminum is greater than 1.

26. The process according to claim 19 wherein the monomeric material comprises 80 to 99 mol percent of a member selected from the group consisting of propylene oxide, 1-butene oxide, and mixtures thereof; and 20 to 1 percent comprising at least one member selected from the group consisting of allyl glycidyl ether, vinyl cyclohexene monoxide, epichlorohydrin, dicyclopentadiene monoxide, isoprene monoxide, butadiene monoxide, and mixtures thereof; and a catalyst comprising a mixture of diethyl zinc and sulfur wherein the atomic ratio of sulfur to zinc is between 2 and 3.

27. The process according to claim 19 wherein the monomeric material is ethylene oxide, the catalyst is a mixture of diethyl zinc and sulfur, and wherein the atomic ratio of sulfur to zinc is between 2 and 3.

28. A composition of matter for use as a catalyst which comprises essentially:
 (I) a primary component represented by the formula $MR'_n$,
 (II) a secondary component selected from the group consisting of sulfur, selenium, and tellurium, and wherein
  (a) the atomic ratio of sulfur, selenium, and tellurium of the secondary component to M is greater than 1, and
  (b) R' is, individually, a member selected from the group consisting of hydrocarbon radicals containing up to 10 carbon atoms,
  (c) M is a metal selected from the group consisting of zinc, cadimum, aluminum and mixtures thereof, and
  (d) $n$ is the valence of the metal M.

29. A composition of matter for use as a catalyst, according to claim 28, wherein the primary component is represented by the formula $MR_n'$ wherein the secondary component is sulfur, and the atomic ratio of sulfur to the metal atoms in the primary component is greater than 1.

30. A composition of matter for use as a catalyst in accordance with claim 29 wherein the primary component is dialkyl zinc.

31. A composition of matter for use as a catalyst in accordance with claim 29 wherein the primary component is diethyl zinc.

References Cited
UNITED STATES PATENTS 3,231,551  1/1966  Herold et al.  _____ 260—88.3

HARRY WONG, Jr., Primary Examiner

U.S. Cl. X.R.

252—428; 260—2, 31.2, 31.4, 33.2, 37, 41, 80.3, 86.1, 838, 850, 858, 874, 887, 890, 894, 898, 899, 901